March 1, 1960   D. DEWAR   2,926,873
BRAKING SYSTEM FOR AIRCRAFT
Filed May 1, 1956
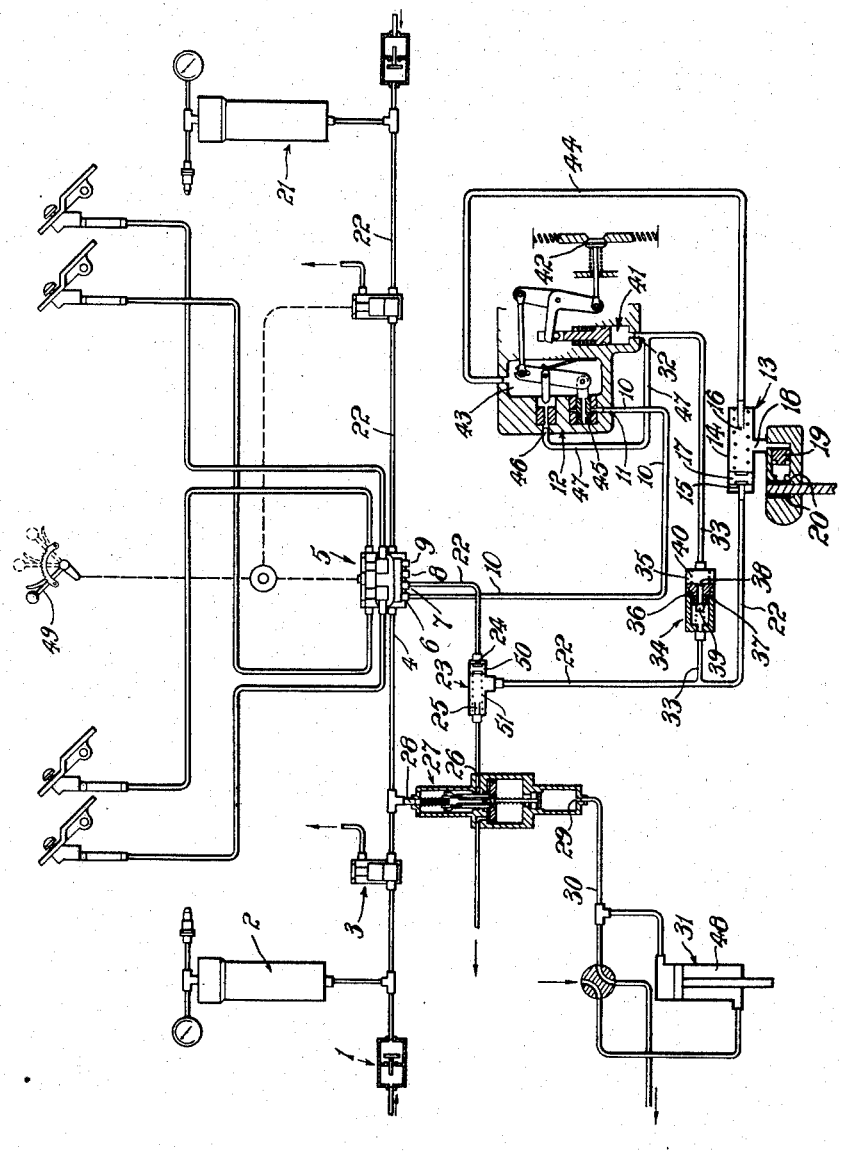
Inventor:
Douglas Dewar
by Benj. T. Rauber
his attorney ly patented.

United States Patent Office 2,926,873
Patented Mar. 1, 1960

2,926,873

BRAKING SYSTEM FOR AIRCRAFT

Douglas Dewar, Wolston, near Coventry, England, assignor to Dunlop Rubber Company Limited, London, England, a British company Application May 1, 1956, Serial No. 581,988

Claims priority, application Great Britain May 7, 1955

9 Claims. (Cl. 244—111)

My invention relates to a braking system for aircraft, and more particularly relates to a duplicate braking system comprising a main and an emergency brake.

Aircraft braking systems are known comprising a main source of supply and an associated system and braking mechanism, and a separate emergency source of supply and an associated system and braking mechanism. Thus should the main source fail, or one of the main system pipe-lines be damaged, the pilot can resort to his emergency system and apply the brake through the emergency source of fluid pressure.

My invention provides an improved braking system of the type in which only one braking mechanism is required for each wheel, the said braking mechanism being operated by either the main or emergency system according to choice.

According to my invention a wheel braking system for aircraft having main and emergency sources of fluid pressure, a brake-actuating mechanism for each wheel operated through a brake-operating valve mechanism either from said main or said emergency source, and automatic braking apparatus having inlet, outlet and exhaust connections associated with each brake-actuating mechanism, comprises a main fluid pressure line connecting said brake-operating valve mechanism with the inlet connection of said automatic braking apparatus, a second fluid pressure line connecting the outlet connection of said apparatus through a normally spring-opened shuttle valve with said brake-actuating mechanism and an emergency fluid pressure line adapted to connect said brake-operating valve mechanism through a second normally spring-closed shuttle valve and through said first-named shuttle valve with said brake-actuating mechanism.

Preferably the aircraft is provided with a retractable undercarriage and the automatic braking apparatus is provided with a fluid pressure-operated plunger and cylinder mechanism to prevent the application of main braking pressure before the wheels rotate on landing, said cylinder communicating with the exhaust connection of the automatic braking apparatus. A cocking valve mechanism, having a time-delay device incorporated therein, is incorporated into the system, having a connection to the main source of supply, to one end of a jack for raising the undercarriage, to a liquid reservoir or atmosphere and to the first-named spring-loaded shuttle valve. Pressurization of the jack to raise the undercarriage automatically opens a valve in said cocking valve mechanism for a predetermined period of time to connect the main source of pressure, through the first-named spring-loaded shuttle valve and into the emergency pressure line, where it operates the plunger and cylinder mechanism to prevent application of braking pressure from the main source and also applies the brakes to prevent the wheels from spinning when retracted.

Reference will now be made to the accompanying drawing which is a diagrammatic illustration of a braking system according to the invention.

In the embodiment of the invention illustrated in the drawing a braking system for aircraft comprises a main source of fluid pressure and an emergency source of fluid pressure. The main supply passes from its source through a non-return valve 1, an accumulator 2 and a reducing valve 3 which reduces the pressure from the source, which may be of the order of 3,000 p.s.i., to a lower value of the order of 1,500 p.s.i. From the reducing valve 3 it passes to an input connection 4 of a brake fluid supply control valve mechanism 5 of the type more fully described in Patent No. 2,682,282, issued June 29, 1954. This mechanism briefly comprises four identical valve mechanisms having a common exhaust chamber, but each valve mechanism being provided with an independent output connection. Reading from the left to the right hand side, mechanisms 6 and 8 are connected through the valve 5 to the main source of supply and mechanisms 7 and 9 are connected through the valve 5 to an emergency source of supply. Mechanisms 6 and 7 are mechanically coupled together and are actuated by the pilot's port brake pedal to operate the port landing wheel, whilst mechanisms 8 and 9 are coupled together and are actuated by the pilot's starboard brake pedal to operate the starboard landing wheel.

The system will now be described as applied to the port landing wheel brake only, it being understood that an identical system operates the starboard brake.

The output connection of mechanism 6 is connected, by a main pressure conduit 10, to the inlet valve passage 11 of a valve mechanism operably associated with a rotary inertia apparatus 12 for automatically controlling the braking pressure to prevent slide or slip of the port landing wheel. This mechanism and apparatus is more fully described in Patent No. 2,656,017, issued October 20, 1953. The operation of the said rotary inertia apparatus is adapted to open an inlet valve 45 to allow pressure fluid to flow therethrough, in the manner more fully described in Patent No. 2,565,017, issued October 20, 1953, and thence through line 44 to one end of a first shuttle valve 13 comprising a chamber 14 having two valve seats 15, 16, one at each end thereof, and a shuttle 17 having a valve at opposite ends thereof to contact said seats 15, 16 and normally spring-urged to close said valve on the seat 15. An output port 18 of said shuttle valve, located intermediate the ends thereof, is connected to a piston and cylinder assembly 19 for operating the wheel brakes 20.

From the output connection 7 of the brake-operating valve mechanism 5, which is fed from the emergency source of fluid pressure 21, an emergency pressure conduit 22 extends to the other end of the spring-closed shuttle valve 13 associated with the brake operating mechanism 20. Interposed in said pressure line 22 is a second spring closed shuttle valve 23, the shuttle 50 therein being spring-loaded against the valve seat 24 to normally close said conduit 22 and the other end 25 of said chamber is connected to the output side 26 of a cocking valve mechanism 27, the input side 28 thereof being connected to the main source of supply between the brake-operating valve mechanism 5 and the reducing valve 3. The cocking valve mechanism 27 is of the type more fully described in Patent No. 2,753,137, issued July 3, 1956, and has a connection 29 to the up-line 30 of the retractable undercarriage, i.e. the retraction side of the jack 31 which controls this movement. The cocking valve mechanism 27 is also connected to a fluid reservoir.

The valve mechanism operably connected to receive fluid from the rotary inertia apparatus 12 through a fluid connection 32 and a shunt pressure conduit 33 is connected to the emergency pressure conduit 22 between the two shuttle valves 13 and 23. Interposed in said line 33 is a non-return valve 34 with constant displacement. This comprises a chamber 35 having a piston 36 slidable therein and spring-loaded against a stop 37. A passage 38 through said piston is normally closed by a spring-loaded ball 39 and the arrangement is such that pressure from the emergency line 22 moves the piston 36 a predetermined distance against the spring 40, the ball-valve 39 remaining closed, whilst exhaust pressure from the rotary inertia apparatus 12 can pass through the ball valve 39 to the emergency pressure conduit 22, and thence through the cocking valve mechanism 27 to exhaust.

The connection 32 of the rotary inertia apparatus 12 communicates with a plunger device 41 contained within said apparatus, which is temporarily moved by back pressure when the undercarriage is raised automatically to close the inlet valve to the rotary inertia mechanism and "cock" it closed and prevent the application of braking pressure to the valve mechanism of the rotary inertia apparatus 12 associated with each wheel before said wheels rotate on landing and which is "un-cocked" by a centrifugally-operated release mechanism 42 associated with said wheel. This construction is more fully described in Patent No. 2,692,100, issued October 19, 1954.

As also described in Patent No. 2,692,100, the valve mechanism associated with, and enclosed in, the rotary inertia apparatus comprises a pressure chamber 43 communicating through a delivery outlet and a conduit 44 with the spring-closed shuttle valve 13 and the brake 20, an inlet valve 45 from the main source of supply, and an exhaust valve 46; both the exhaust valve 46 and inlet valve 45 being operated automatically by the rotary inertia mechanism of the apparatus 12 to admit pressure fluid to the conduit 44 and close the exhaust passage when the aircraft wheel reduces speed of rotation. A conduit 47 connects the exhaust valve with the pipe-line 33 extending between the plunger device 41 and the constant displacement non-return valve 34.

(Although the conduit 47 is shown in the drawing as being disposed externally of the device 12, in practice this conduit is formed within the device itself. It is shown externally in the drawing for convenience and clarity only.)

The operation of the apparatus is as following—

When there is no lack of pressure fluid from the main supply nor any break or failure in the apparatus supplied by the main supply, the apparatus operates in the normal manner. However, if there is any failure of the main supply or of the apparatus depending upon it, then the brakes are operated from the emergency supply through an emergency supply system.

In the normal operation of the apparatus, with the aircraft approaching the ground for landing, all of the elements of the apparatus are as shown in the drawing. Fluid pressure is supplied through the main 11 and the inlet conduit 4 to the fluid supply control valve 5. The pilot may open his control valve to the fluid supply control valve 5 and from this valve to the main 10 and thence to the rotary inertia apparatus 12.

The position of the elements of this apparatus will be as shown in the drawings until the aircraft wheels contact the ground and attain a speed sufficient to release the release mechanism 42. Thereupon this release will be moved to the right and the levers connected therewith will swing counter-clockwise opening the valve 45 to the chamber 43 and closing the exhaust valve 6. Pressure fluid will then flow from the chamber 43 through the conduit 44 and the first shuttle release valve 13 to the brake applying cylinder and piston 19 applying the brakes. Upon a sliding of the wheels on the ground the rotary inertia mechanism will close the inlet valve 45 and open the exhaust valve 46, as described in Patent 2,656,017, whereupon the pressure fluid will be released from the brake cylinder 19 through the first shuttle release valve 13, conduit 44, chamber 43, conduit 47, check valve 34, second shuttle valve 23 and the cocking valve mechanism 27. Upon resumption of the speed of the wheel the inlet valve 45 will be opened and exhaust valve 46 closed to again apply the brakes. This will continue until the aircraft has been brought to a stop.

When the aircraft again takes flight the pilot will relieve pressure on the brakes through his control valve. As the aircraft leaves the ground pressure fluid will be admitted to the conduit 30 and to the aircraft jack 31. It will also be admitted to the cylinder 29 of the cocking valve mechanism 27 thereby lifting the pistons therein to close the exhaust and permit pressure fluid to flow from the cocking valve mechanism 27 through the second shuttle valve 23 to move the piston 36 toward the left thus forcing an amount of fluid under pressure through the conduit 33 into the chamber 41 of the rotary inertia device thus forcing the release element 42 to cocking position. At the same time pressure fluid will be forced through the conduit 47 to open exhaust valve 46 to the chamber 43 and thence through the conduit 44, first shuttle valve 13 to the brakes, to apply the brakes temporarily to stop them from spinning. The cocking valve mechanism 27 has a bleed opening which permits the pistons therein to fall, as described in Patent 2,753,137, opening the conduit 26 to exhaust and permitting the pressure fluid to escape reversely from the cylinder 41 and through the exhaust valve 46 from the brake 19 reversely through the check valve 34 to the second shuttle valve 23 and the cocking valve mechanism to exhaust. This again places the elements of the apparatus in the position shown in the drawing.

If the main supply should for any reason fail the pilot actuates the control lever 49 and the fluid pressure control valve 5 to admit emergency pressure fluid from the main 22 through the valve 5 to the conduit 22. Pressure from the conduit 22 enters the second shuttle valve 23 to move its piston to the left closing the exhaust through the cocking valve mechanism 27 and opening a passage to the conduit 22. Thus pressure flows through the first shuttle valve 13 to the brake and the operation of the brake is thereafter under the direct control of the pilot free from the control of the rotary inertia mechanism 12. The air entering the first shuttle valve moves the piston 17 to the right closing access to the conduit 44. The piston 37 of the valve 34 may move to the left and supply pressure fluid to the rotary inertia mechanism 12, but this will have no effect on the operation of the brake as this mechanism is closed by the shuttle valve 17 from the brake operating cylinder 19.

Having now described my invention—what I claim is:

1. A braking apparatus for aircraft having fluid operated brakes and a main and an emergency source of pressure fluid which comprises a supply control valve mechanism to receive fluid from said main and emergency sources alternatively and to supply main and emergency fluid to said fluid operated brakes, an automatic braking apparatus for each fluid operated brake connected to each said main supply from said supply control valve, said automatic braking apparatus having an inlet valve, an exhaust valve and a delivery outlet, a first shuttle valve connected to said delivery outlet and having a delivery connection for the fluid operated brakes, said shuttle valve being normally spring pressed to permit passage of fluid from said delivery outlet to said delivery connection, a second shuttle valve to receive emergency fluid from said supply control valve and to deliver it to said first shuttle valve, said second shuttle valve being normally spring pressed to close said emergency supply from said supply control valve but being opened by emergency fluid pressure to deliver to and through said first supply valve and said delivery outlet of said first supply valve.

2. A braking apparatus for aircraft having fluid operated brakes, a fluid operated retractable undercarriage and a main and an emergency source of pressure fluid which comprises a supply control valve to receive fluid from said main and emergency sources and to supply alternatively main and emergency fluid for said fluid operated brakes, an automatic braking apparatus for each fluid operated brake having an inlet valve connected to the main fluid delivery of said supply control valve, an exhaust valve, a delivery outlet and fluid operated means to close the inlet valve and open the outlet valve, a primary shuttle valve connected to said delivery outlet and having a delivery connection for a fluid operated brake and spring pressed to open communication from said delivery outlet to said delivery connection, a cocking valve mechanism having a delivery opening actuated by fluid pressure from the retractable undercarriage upon retraction to admit pressure fluid to said delivery opening, and a secondary shuttle valve connected to said delivery opening and to the emergency fluid supply from said supply control valve and having a delivery passage to an inlet of said primary shuttle valve normally closed by said spring pressure and opened by fluid pressure to supply fluid to said delivery connection.

3. The braking apparatus of claim 2 having means actuated by fluid pressure from said secondary shuttle valve to close temporarily the inlet and open the exhaust of said automatic braking apparatus.

4. The braking apparatus of claim 3 in which said cocking valve has an exhaust normally open and in which said means actuated by fluid from said secondary shuttle valve comprises a piston between the delivery passage of the secondary shuttle valve and the exhaust and the fluid operated means to close the inlet and open the exhaust of said automatic braking apparatus, said piston being movable by pressure from said secondary shuttle valve to transmit fluid pressure to the means of said automatic braking apparatus and a check valve to permit flow from said automatic braking apparatus to said cocking valve mechanism and to exhaust.

5. The braking apparatus of claim 4 in which said check valve is mounted in said piston.

6. The apparatus of claim 3 in which said cocking valve has an exhaust normally open and closed upon raising of said retractable undercarriage and having means to transmit fluid pressure from said secondary shuttle valve to said automatic braking apparatus to close its inlet valve and open its exhaust valve.

7. A wheel braking system according to claim 2 wherein said first-named shuttle valve has one end in pressure fluid communication with the delivery outlet from said rotary inertia apparatus, and its other end in pressure fluid communication with said emergency pressure conduit, an outlet connection between said two ends in pressure fluid communication with said brake cylinder, and a sliding shuttle therein normally spring-urged to close said pressure-fluid communication from said emergency pressure line to place said outlet connection in pressure fluid communication with said rotary inertia apparatus.

8. A wheel braking system according to claim 2 wherein said second-named shuttle valve has one end in pressure fluid communication with said cocking valve mechanism and its other end in pressure fluid communication with the part of said emergency pressure conduit leading from said supply control valve, an outlet connection midway of said two ends in pressure fluid communication with the part of said emergency pressure conduit delivering said first shuttle valve, and a sliding shuttle therein normally spring-urged to close the pressure fluid communication between said parts of said emergency pressure conduit to open the pressure fluid communication between said cocking valve mechanism and the part of said emergency pressure conduit leading to said first shuttle valve, whereby on application of fluid pressure to the undercarriage-retraction side of said jack said time-delay in said cocking valve mechanism is actuated to apply fluid pressure through said emergency pressure conduit temporarily to apply the brake and so to prevent the wheels from spinning during their retraction.

9. A braking apparatus for aircraft having a fluid operated brake cylinder, a fluid operated jack for a retractable undercarriage and a main and an emergency source of pressure fluid which apparatus comprises main and emergency pressure fluid conduits, a supply control valve to receive fluid from said main and emergency sources and to supply, alternatively, said main and emergency pressure fluid conduits, a rotary inertia apparatus for said brake cylinder having an inlet valve connected to said main pressure fluid conduit, an exhaust valve, a delivery outlet and fluid operated means to close the inlet valve and open the exhaust valve, a first shuttle valve connected to said delivery outlet and having an outlet port delivering to said brake cylinder and spring pressed to open communication from said delivery outlet to said outlet port, said emergency conduit leading from said supply control valve to said first shuttle valve opposite to said connection to the entrance of fluid from said rotary inertia apparatus to close said outlet port from said rotary inertia apparatus and open it to said emergency conduit, a second shuttle valve interposed in said emergency pressure fluid conduit between said supply control valve and said first shuttle valve and spring pressed to close passage of fluid in said emergency pressure fluid conduit, a cocking valve mechanism connected to said main source of pressure fluid to said second shuttle valve and to exhaust and normally open to exhaust and closed to said main pressure fluid supply and actuated by the pressure fluid supply to said jack in retracting said undercarriage temporarily to close said exhaust and to open a passage from said main pressure fluid supply to said emergency fluid conduit between said second shuttle valve and said first shuttle valve, a shunt conduit from said emergency fluid conduit between said shuttle valves to the fluid operated means and the exhaust valve of said rotary inertia apparatus to supply pressure fluid to said brake cylinder and to move and cock the inlet valve thereof to closed position.

References Cited in the file of this patent

UNITED STATES PATENTS 2,504,096     Wells  ---------------- Apr. 11, 1950

FOREIGN PATENTS 159,977     Australia ------------- Nov. 25, 1954